United States Patent [19]

Anderson

[11] Patent Number: 5,283,829
[45] Date of Patent: Feb. 1, 1994

[54] SYSTEM AND METHOD FOR PAYING BILLS ELECTRONICALLY

[75] Inventor: Milton M. Anderson, Fair Haven, N.J.

[73] Assignee: Bell Communications Research, Inc., Livingston, N.J.

[21] Appl. No.: 955,087

[22] Filed: Oct. 1, 1992

[51] Int. Cl.⁵ .............................................. H04K 1/00
[52] U.S. Cl. ...................................... 380/24; 380/9; 235/379; 235/381; 379/91; 379/93
[58] Field of Search .................... 380/9, 24; 235/379, 235/381; 379/91, 93

[56] References Cited

U.S. PATENT DOCUMENTS

| | | | |
|---|---|---|---|
| 3,956,615 | 5/1976 | Anderson et al. | 380/24 |
| 4,317,957 | 3/1982 | Sendrow | 380/24 |
| 5,007,084 | 4/1991 | Materna et al. | 380/24 |
| 5,220,501 | 6/1993 | Lawlor et al. | 364/408 |

OTHER PUBLICATIONS

*European Electronic Overview*, Linda K. S. Moore, Consumer Bill Payments Update '92, Apr. 22, 1992.
*Consumer Bill Payments "Front End" Overview*, George C. White, Consumer Bill Payments Update '92, Apr. 22, 1992.
*Bill & Pay Minitel*, Dr. Denis Manelski, Consumer Bill Payments Update '92, Apr. 22, 1992.
*TV Answer Bill Paying*, Daniel M. Pence, Consumer Bill Payments Update '92, Apr. 22, 1992.
*ScanFone by US Order*, John C. Backus Consumer Bill Payments Update, Apr. 22, 1992.
*Screenphone to ATM Networks, Online Resources*, Paul J. Mila Consumer Bill Payments Update, Apr. 22, 1992.
*"Back End" Options to Merchants*, Dennis J. Pope Consumer Bill Payments Update, Apr. 22, 1992.
*Bill Payment Initiation from Retail Stores*, George C. White Consumer Bill Payments Update, Apr. 22, 1992.
*Bill Payment Consolidation Service*, Glen P. Sgambati, Consumer Bill Payments Update '92, Apr. 22, 1992.
*Citibank Enhanced Telephone*, Victor Passaro Consumer Bill Payment Update '92, Apr. 21, 1992.
*Electronic Payments Commentary*, George C. White, Journal of Cash Management, Sep./Oct. 1990.
*"I Threw Away My Checkbook"*, Chris Shipley, PC Computing, Nov. 1990.
*How to Construct Random Permutations from Pseudo Random Functions*, M. Luby and C. Rackoff, SIAM J. Comput., 17(2), 373–386, 1988.
*A New Class of Check–Digit Methods for Arbitrary Number Systems*, IEEE Trans. on Information Theory, IT-31:1-2-105, Jan. 1985.
*Data Encryption Standard*, The National Bureau of Standards Jan. 1977, U.S. Department of Commerce FIPS pub. 46.

Primary Examiner—David C. Cain
Attorney, Agent, or Firm—Leonard Charles Suchyta; Loria B. Yeadon

[57] ABSTRACT

An electronic bill payment system and method include billing equipment for creating approval records and generating approval numbers for each pre-authorized subscriber. The system also includes an interactive payment approval apparatus into which subscribers dial to approve payment and which determines, based upon information collected, whether to initiate electronic funds transfer. An approval record data base and a call history log data base are also part of the bill payment system. To approve electronic bill payment a subscriber, once pre-authorized, need only dial up the payment approval apparatus and enter the assigned approval number. A series of security checks and comparisons are performed to guard against accidental and malicious entry of approval numbers. Once all security checks are cleared, a confirmation number is announced to the subscriber, and an electronic funds transfer is initiated.

19 Claims, 12 Drawing Sheets

FIG. 5

Authorization page for 908 555 7654 214:

To pre-authorize electronic payments from the account specified below to pay monthly bills, please complete and sign this page. Return this page along with a voided unsigned blank check from the account specified below.

I, Customer Name, preauthorize electronic funds transfers from the account specified below to Coastal Bell, at the time and in the amount that I will approve by telephone after receiving each monthly bill:

Bank Name: _____
Address: _____
Town, State, ZIP: _____

Account Number: _____

Signature: _____
Date: _____

Approve from 908 555 7658 only: ___ check here
Input later payment date: ___ check here

FIG. 7

To pay $70.36 automatically from your account at the Second US Bank of Morristown please call 1 800 PAY BILL by February 26, 1992 and enter the approval number 743 98 23 834 18 49 using tone dialing. If you call from other than your home phone, you may also be asked to provide additional information. Please write your confirmation number here _____, and in your check register for future reference.

SYSTEM AND METHOD FOR PAYING BILLS ELECTRONICALLY

FIELD OF INVENTION

This invention relates to a system and method for paying bills, such as telephone bills, via electronic funds transfer.

BACKGROUND OF THE INVENTION

Subscribers of utilities are typically billed monthly for usage during the preceding month. Subscribers are sent, via regular mail, a written billing statement, which itemizes the services being provided and associated costs. Specifically, billing statements for telephone services indicate the type of standard services being rendered, special features subscribed to, toll usage during the month, as well as state and federal taxes, maintenance fees and applicable access and line charges. In addition, the billing statement informs the subscriber of the deadline for payment to avoid service charges and to assure uninterrupted service.

Upon reviewing the charges and verifying that billing is correct, subscribers typically write a check for the billed amount and return the check along with an appropriate page of the billing statement to the telephone service provider via regular mail. Rarely do billing questions arise which would necessitate that the subscriber make personal contact with the telephone business office. Some subscribers, particularly those who make payment on or about the payment deadline, must visit the billing office to ensure payment credit by the payment deadline.

The cost to the subscriber who remits payment via check through the regular mail is twenty-nine to about fifty-nine cents (twenty-nine cents for standard postage and up to about thirty cents for the blank check and per item bank charges). For near-deadline remitters, the cost to make payment will include travel expenses to the business office, any time lost from work, and the hassle of long lines at business offices that may result around billing deadlines. The administrative cost to the telephone company in facilitating these methods of bill payment can be measured in terms of the personnel hired to physically open payment envelopes and manually enter subscriber's payment into the billing equipment and extra personnel needed to assist the volume of subscribers who make payment in person at the last minute.

The administrative costs to banking institutions of subscribers paying by check can be measured in terms of the cost of depositing and clearing checks. Banking institutions also incur the cost of microfilming and returning cancelled checks to subscribers. Some of these bank costs may be recovered by charging a per item deposit fee to the utility company, increasing its costs.

To obviate the expense and hassle of paying bills via check and regular mail, various establishments offer the option to subscribers of having their bill automatically paid via automatic funds transfer. This bill payment option has proven quite sensible and useful for paying bills that are for the same monthly amount (such as car notes, insurance premiums, mortgages, etc.); however, for bills that vary based upon customer usage or from period to period, this option is undesirable because the subscriber is not aware of the billing amount prior to automatic payment. More importantly, the subscriber has no opportunity to review and approve the charges prior to payment being made. Another drawback is that conventional electronic bill payment options are somewhat restrictive in that subscribers have no flexibility to pay the bill on a date other than that pre-specified at the time that automatic funds transfer is established.

Other establishments have developed bill paying schemes which require the subscriber to subscribe to a special communications or home banking network and/or purchase special hardware in order to pay bills electronically. Excel home banking system, a product of Hanover Trust, Prodigy consumer service, which is jointly owned by IBM and Sears, and CheckFree, a PC based bill paying service of CheckFree Corporation, to name a few, offer bill paying schemes via a specialized network service. In addition, these schemes may require the subscriber to purchase a computer (terminal or PC), to purchase special software, and to be a proficient computer user. Other consumer electronic bill payment alternatives, which employs special hardware, include: a Home Transaction System by U.S. Order, which uses a ScanFone; Online Banker service by Online Resources and Communications Corp. which uses a Screen Phone; CitiOne Bill Payment Services by Citi-Bank which uses an enhanced telephone; Bill and Pay System offered by Minitel, a subsidiary of France Telecom, which requires a Minitel unit or a PC; and TV Answer Communications network service which uses a TV answer home unit. These pre-requisites to many electronic bill payment alternatives, such as access to specialized networks, special hardware and software, and special computer skills, discourage subscribers from changing from their conventional bill payment methods of writing checks.

Furthermore, many of these proposed bill payment systems are driven by customer interaction with extensive and complicated menus, which are perceived by many subscribers to be too complex and cumbersome for practical use. Conventional systems also require the subscriber to input highly sensitive and personal information (such as bank account numbers) in order to effect bill payment. Subscribers are particularly apprehensive to disclose such sensitive information since subscribers generally perceive most bill payment systems to be insecure and vulnerable to improprieties. Subscribers' perceptions, in many cases, are justified given the susceptibility of the communications link between a subscriber's telephone and the payment system to eavesdropping and tapping and the vulnerability of computer systems to hackers. As a result, subscribers are hesitant and reluctant to transact bill payments using these electronic systems.

SUMMARY OF THE INVENTION

Therefore, an object of my invention is an electronic bill payment system and method for paying bills, such as telephone bills, via electronic funds transfer. Thus, my bill payment system and method obviate the hassle and expense of remitting payment via regular mail and the inconveniences associated with making payment in person and on or about the payment deadline. My inventive system and method allow subscribers to review and approve bill payment prior to an electronic transfer of funds being effected and to control the timing of the payment. In addition, my inventive system and method minimize security risks associated with conventional electronic bill payment options by assigning a unique approval number to each subscriber's current bill, which can be used by the subscriber to effect approval of electronic payment.

My inventive system for approving electronic bill payment includes billing equipment which prepares billing statements for subscribers, creates an approval record for each subscriber pre-authorized for electronic payment, and assigns an approval number, which uniquely identifies each pre-authorized subscriber's bill. My inventive system also includes an interactive payment approval apparatus which serves as subscribers' interface to the bill payment system and processes subscribers' requests for approving electronic bill payment. The payment approval apparatus processes the approval numbers entered by the subscriber during an approval transaction, queries the approval record data base to verify the validity of the approval number entered by subscribers, and performs other security checks, if necessary. The payment approval apparatus may also include error detection to guard against accidental or malicious entry of approval numbers which might otherwise trigger payment of another subscriber's telephone bill.

The inventive bill approval and payment method of my invention includes processing the subscriber's pre-authorization form to electronically pay the current bill via electronic funds transfer subject to the subscriber's approval of the current billing statement. This process entails receiving the subscriber's accounting and banking information and other pre-requisite information. Once pre-authorization is completed, an approval record is created, and an approval number is generated for each pre-authorized subscriber and printed on the subscriber's billing statement. If the subscriber wishes to approve the current bill for electronic payment, the subscriber need only dial into the payment approval apparatus as instructed on the billing statement and enter the approval number using the tone dialing keypad of the telephone instrument.

The interactive payment approval apparatus checks the validity of the approval number and queries the approval record data base to verify that the approval number corresponds to an approval record for a pre-authorized subscriber. As a security measure, my inventive method could entail comparing the telephone number from which the subscriber is dialing with a call history log of telephone numbers from which the subscriber has previously authorized electronic payment. If a match is not found, the interactive payment approval apparatus could further prompt the subscriber for additional information to approve electronic payment or terminate the call. Once bill approval is completed, the payment approval apparatus relays a message to the billing equipment to initiate payment via electronic funds transfer from the subscriber's account to the telephone service provider, and a confirmation number is announced to the subscriber.

My inventive system and method of electronic bill payment are inherently secure since no account numbers or payment amounts are entered by the subscriber during the payment approval session; therefore, this information is not subject to interception or theft during the subscriber's approval transaction. Furthermore, a different approval number is generated for each pre-authorized subscriber and billing period. Also, entry of the approval number can only effect payment for the specific billed amount from the subscriber's pre-specified account to that of the service provider. My inventive system and method are also simple and easy for the subscriber to use, requiring no special hardware, software, or computer proficiency as do other proposed bill payment alternatives. No personal identification numbers or passwords need be remembered, and no complex menus and decision trees need be worked through to effect electronic bill payment.

BRIEF DESCRIPTION OF THE DRAWING

FIG. 5 depicts a sample of a pre-printed pre-authorization form to be completed by subscribers to pre-authorize electronic funds transfer for payment of future bills.

FIG. 7 depicts an example of the notice and instructions to be included in the billing statement of the pre-authorized subscriber.

DETAILED DESCRIPTION

An aspect of my invention is a system and method for paying bills via electronic funds transfer. My electronic bill payment system assigns a unique approval number to each subscriber's bill, which number is pre-assigned and pre-printed on the subscriber's billing statement mailed to the subscriber for the billing period. Upon reviewing the billing statement and being satisfied that all charges are accurate, the subscriber can approve electronic payment of the bill by dialing, via the public switched network, into the payment approval apparatus and entering the assigned approval number.

My electronic bill payment system and method could be suitable for a host of billing applications. For example, product and service providers could implement my system and method to provide their subscribers with a simple and efficient mechanism for remitting payment of their bills. For example, public utility companies, such as gas, electric, telephone, water, garbage, and sewage companies could employ this system and method to minimize the cost of bill payment processing. In addition, bill payment services, which bill and collect payment from subscribers on behalf of a host of product and service providers, could also utilize this system and method. Generally, this system and method could be effectively utilized to approve any electronic funds transfer from a subscriber's account even for making periodic contributions to a favorite charity or payments for entertainment books, records, or videos ordered from a mail-order entertainment club.

Clearly, my inventive system and method could be gracefully implemented in a number of different applications to facilitate bill payment. For the purpose of a specific illustrative example, my system and method are discussed in the context of electronic payment of telephone bills.

Figure 1:
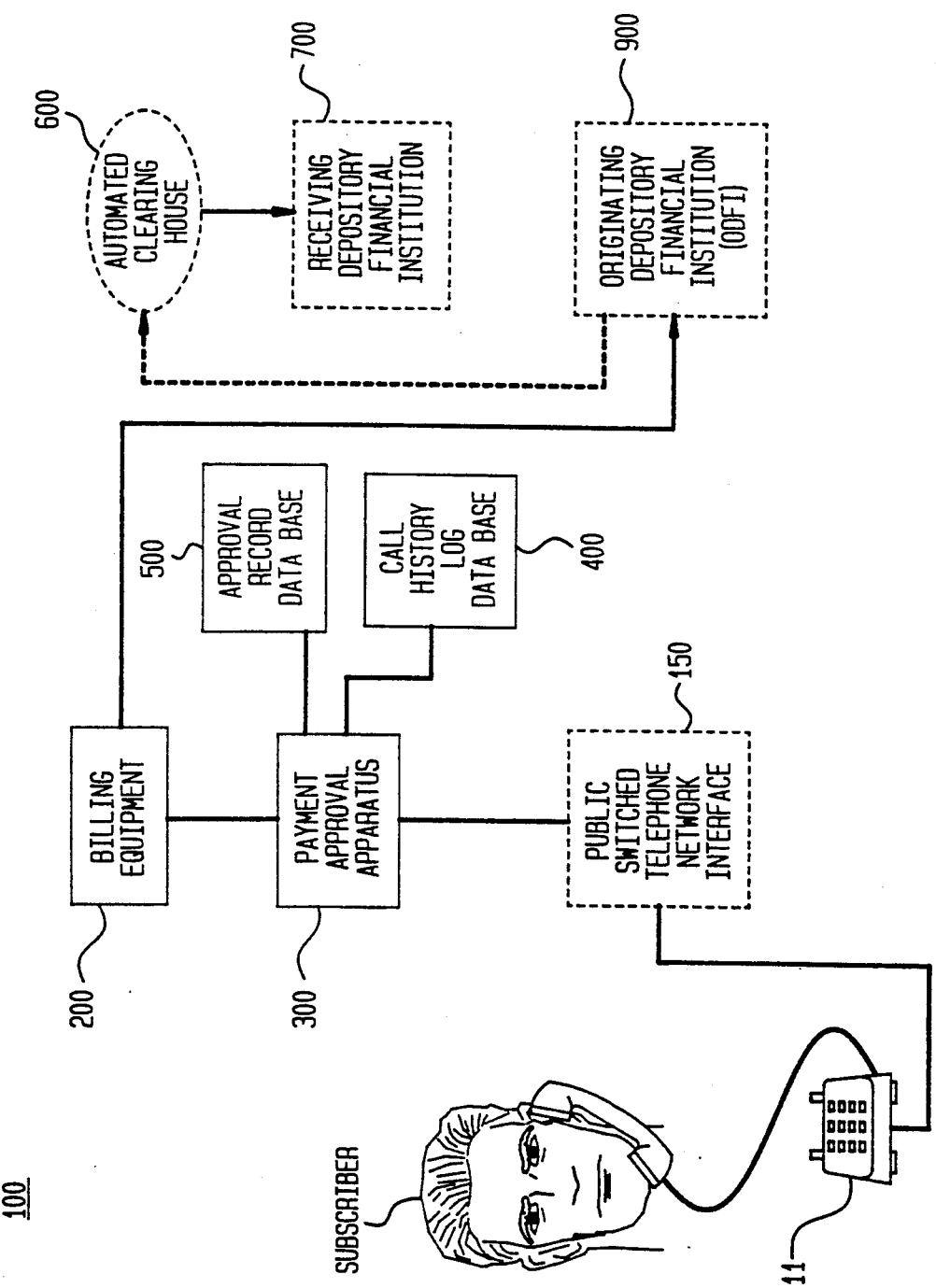
FIG. 1 is a schematic representation of an illustrative embodiment of my system for paying bills electronically in accordance with an aspect of my invention.

The components of my inventive electronic bill payment system 100, as shown in FIG. 1, include billing equipment 200, a payment approval apparatus 300, a call history data base 400 and an approval record data base 500. The billing equipment 200 of my invention functions much like conventional billing equipment employed by local telephone service providers and long-distance carriers and which maintains records of subscriber's charges, payments, etc. and prepare billing statements. As can be seen in FIG. 1, the subscriber accesses the bill payment system 100 from the subscriber's telephone 11 through the public switched telephone network 150. In addition, the payment approval apparatus 300 can access the service provider's bank, which is known in the banking industry as the originating depository financial institution (ODFI) 900. The ODFI 900 can access other utilities such as the automated clearing house 600, which links to the subscriber's banking institution known as the receiving depository financial institution (RDFI) 700.

Figure 2:
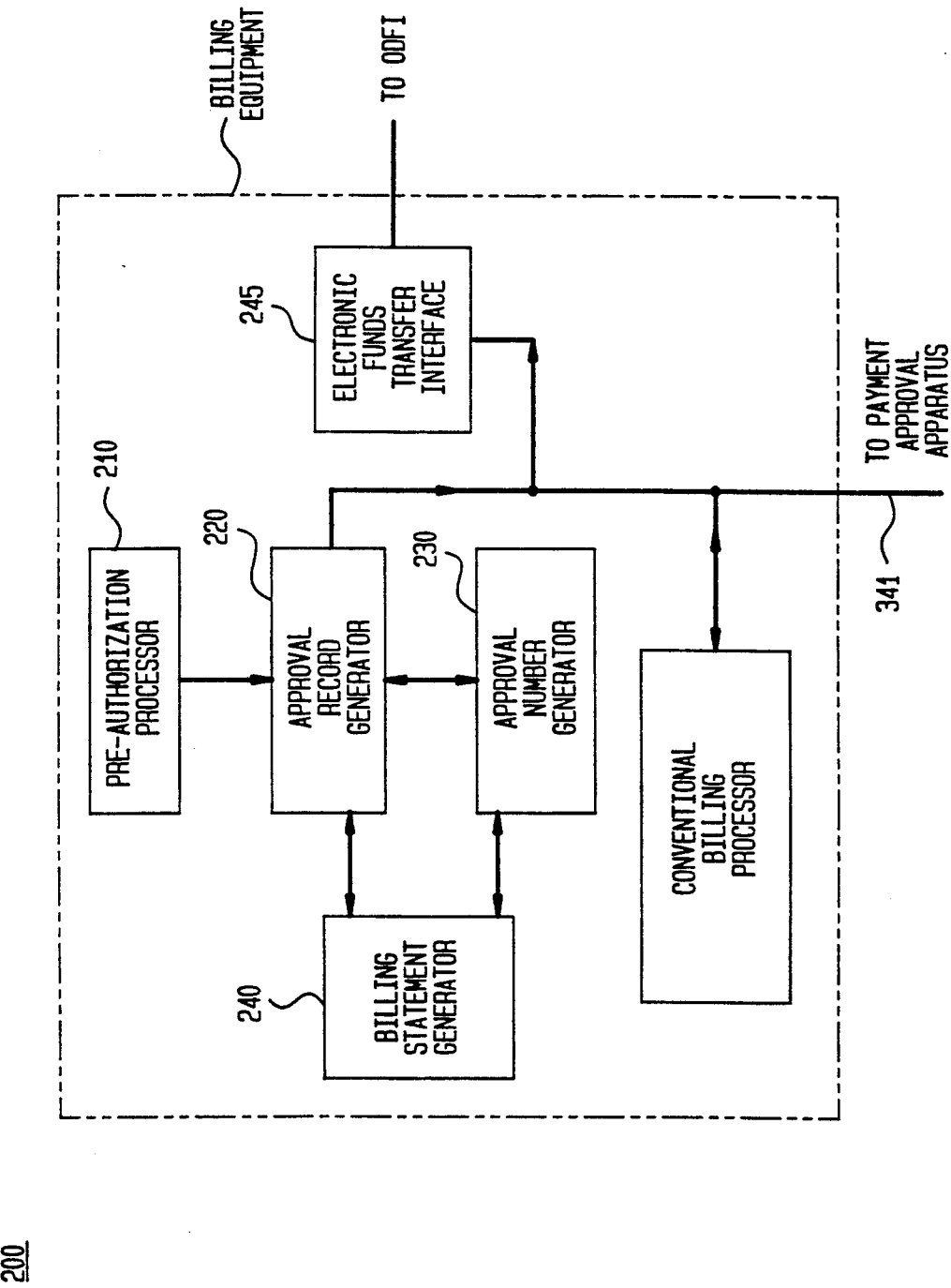
FIG. 2 is a schematic representation of illustrative billing equipment in accordance with an aspect of my invention for the embodiment of FIG. 1.

As shown in FIG. 2, the billing equipment of my invention also includes a pre-authorization processor 210 for processing subscriber's pre-authorization forms, which subscribers complete to be entitled to electronic bill payment privileges. Pre-authorization information is used by the approval record generator 220 for creating an approval record for each pre-authorized subscriber. The billing equipment 200 also includes an approval number generator 230 which assigns to each subscriber's bill a unique approval number, which is pre-printed in the subscriber's current billing statement to be used for approving electronic bill payment. A more detailed discussion of the approval number generator is provided in the following section. My billing equipment also contains a billing statement generator 240 connected to both the approval record generator 220 and the approval number generator 230 and an electronic funds transfer interface 245 for facilitating communication between my bill payment system 100 and the ODFI 900, which orders electronic funds transfers.

Figure 3A:
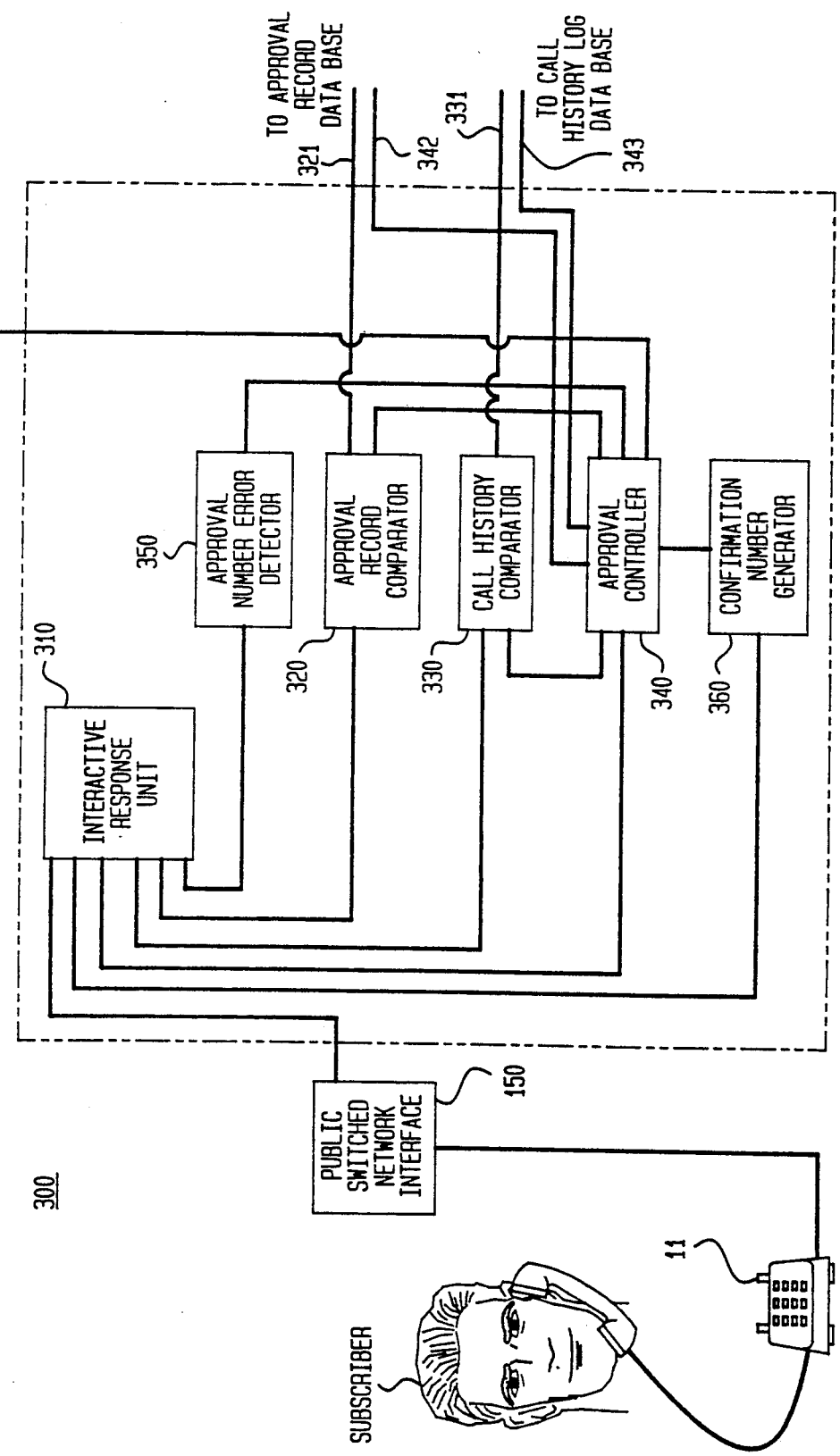
FIGS. 3A and 3B are schematic representations of illustrative payment approval apparati in accordance with an aspect of my invention for the embodiment of FIG. 1.
Figure 3B:
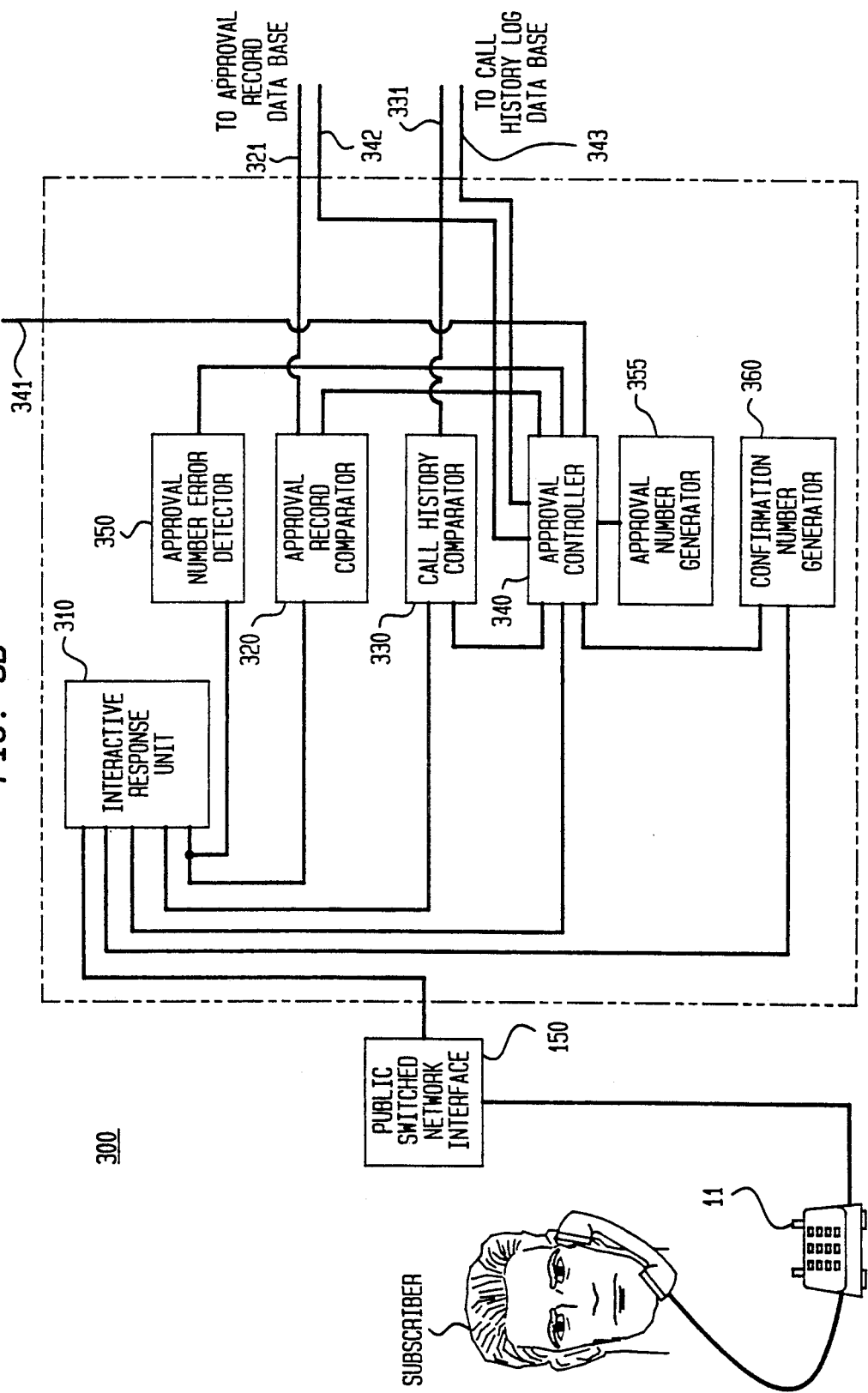

Another element of my electronic bill payment system 100 is the payment approval apparatus 300 shown in FIGS. 3A or 3B. This apparatus serves as subscribers' interface to the electronic bill payment system 100 for approving electronic payment of their telephone bills. The payment approval apparatus receives approval records for each pre-authorized subscriber via lead 341 at the approval controller 340, which controls the storage of the approval record in the approval record data base 500 via lead 342. Approval numbers for each billing period are similarly stored in the approval record database 500.

As shown in FIG. 3B, the payment approval apparatus 300 may also include an approval number generator 355 which is separate from approval number generator 230 in the billing equipment 200 shown in FIG. 2. Approval number generator 355 utilizes the same approval number generating method, described in the following section, as approval number generator 230 of FIG. 2, to yield the same approval number for each pre-authorized subscriber. By employing approval number generator 355 at the payment approval apparatus 300, loose coupling between the payment approval apparatus 300 and the billing equipment 200 can be tolerated since approval numbers need not be transferred from the billing equipment 200 via lead 341 to the approval payment apparatus 300 during each billing period.

The payment approval apparatus includes an interactive response unit 310, which prompts the calling subscriber for approval information and detects the subscriber's response and other information from the public switched network interface 150 relating to the call. Upon an approval number being entered by the subscriber, the interactive response unit 310 forwards this information to check the validity of the approval number. If the approval number has been specially coded such that single transpositions and substitutions are detectable, then the approval number is forwarded to an approval number error detector 350. Furthermore, if the approval number has been generated using an invertible hash function, then the approval number is also decoded at the error detector 350 and checked for validity.

In addition, the approval number and other responses and information collected during the approval transaction are forwarded to an appropriate comparator to verify its validity. For example, the approval number entered by the subscriber is forwarded to the approval record comparator 320 which compares the approval number entered by the subscriber to the approval number associated with each approval record in the approval record data base 500 via lead 321 (see FIGS. 3A and 3B). The subscriber may be prompted for other information such as the last four digits of his or her bank account number as an additional security measure, and the subscriber's response would be compared at the approval record comparator 320 with the bank account number provided by the subscriber during pre-authorization and stored in the subscriber's approval record.

As shown in FIG. 1, my electronic bill payment system 100 also includes an approval record data base 500 and a call history log data base 400. The approval record data base 500 stores approval records created at the billing equipment 200 for access by the payment approval apparatus 300. As indicated above, information stored in the subscriber's approval record may be compared with the subscriber's responses at the approval record comparator 320 (see FIGS. 3A or 3B).

The call history log data base 400 stores telephone numbers from which the subscriber previously approved electronic payment of his or her telephone bill. A separate log is maintained in the call history log data base 400 for each pre-authorized subscriber. The subscriber's log is accessed by the call history comparator 330 via lead 331 (see FIGS. 3A and 3B), and the telephone number from which the subscriber is presently dialing is compared against the subscriber's log of telephone numbers. The results of the comparison are utilized by an approval controller 340, which controls prompts being sent to the subscriber via the interactive response unit 310 during the approval transaction. The approval controller 340 also signals the billing equipment 200 over lead 341 to initiate electronic funds transfer upon successful completion of the approval transaction. Once the approval transaction is completed, the approval controller 340 provides, via lead 343, the call history log database 400 with the telephone number from which the subscriber is dialing for updating the subscriber's call history log.

Figure 4A:
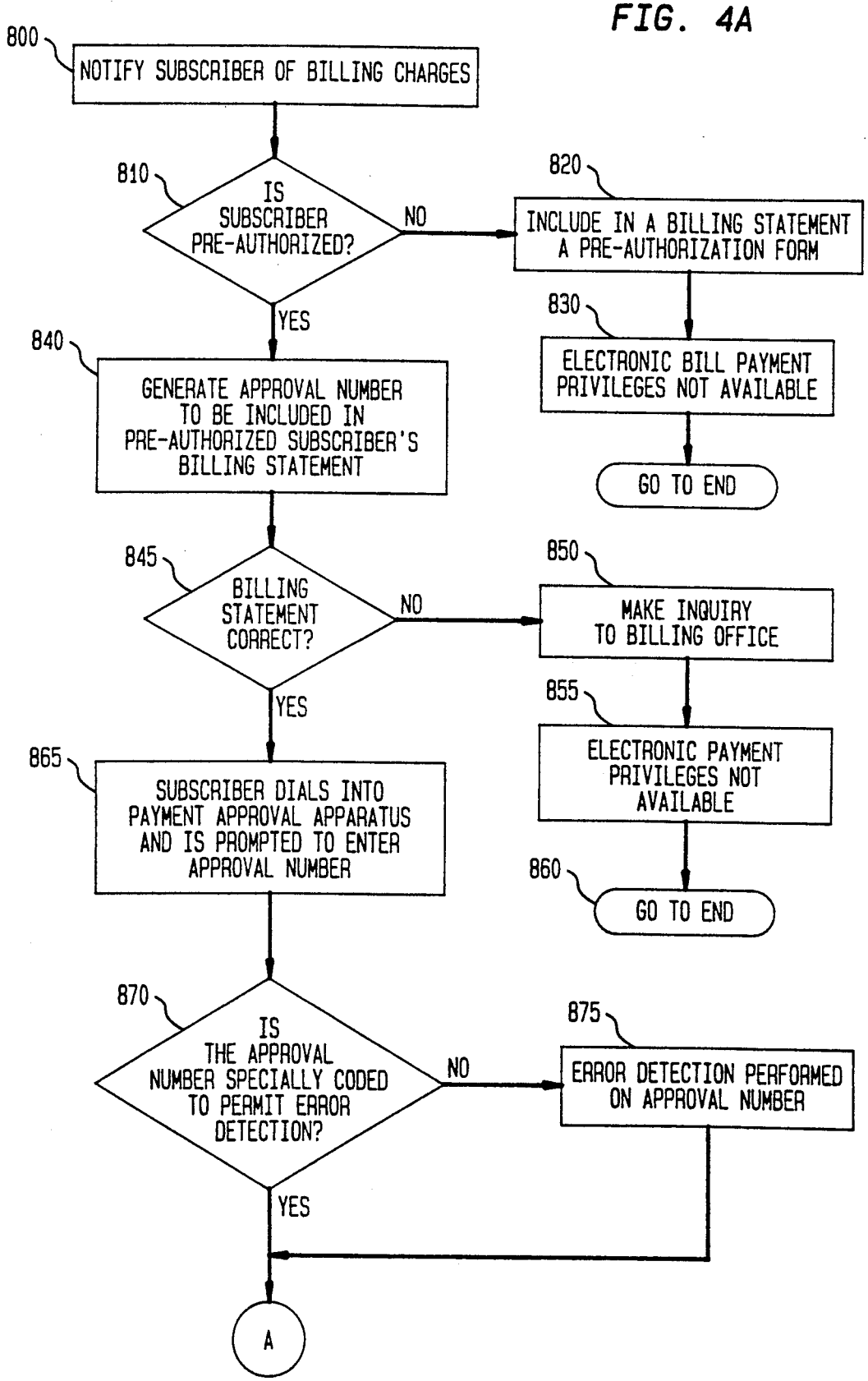
FIGS. 4A and 4B depict a flow diagram of my inventive electronic bill payment method in accordance with an illustrative embodiment of my invention.
Figure 4B:
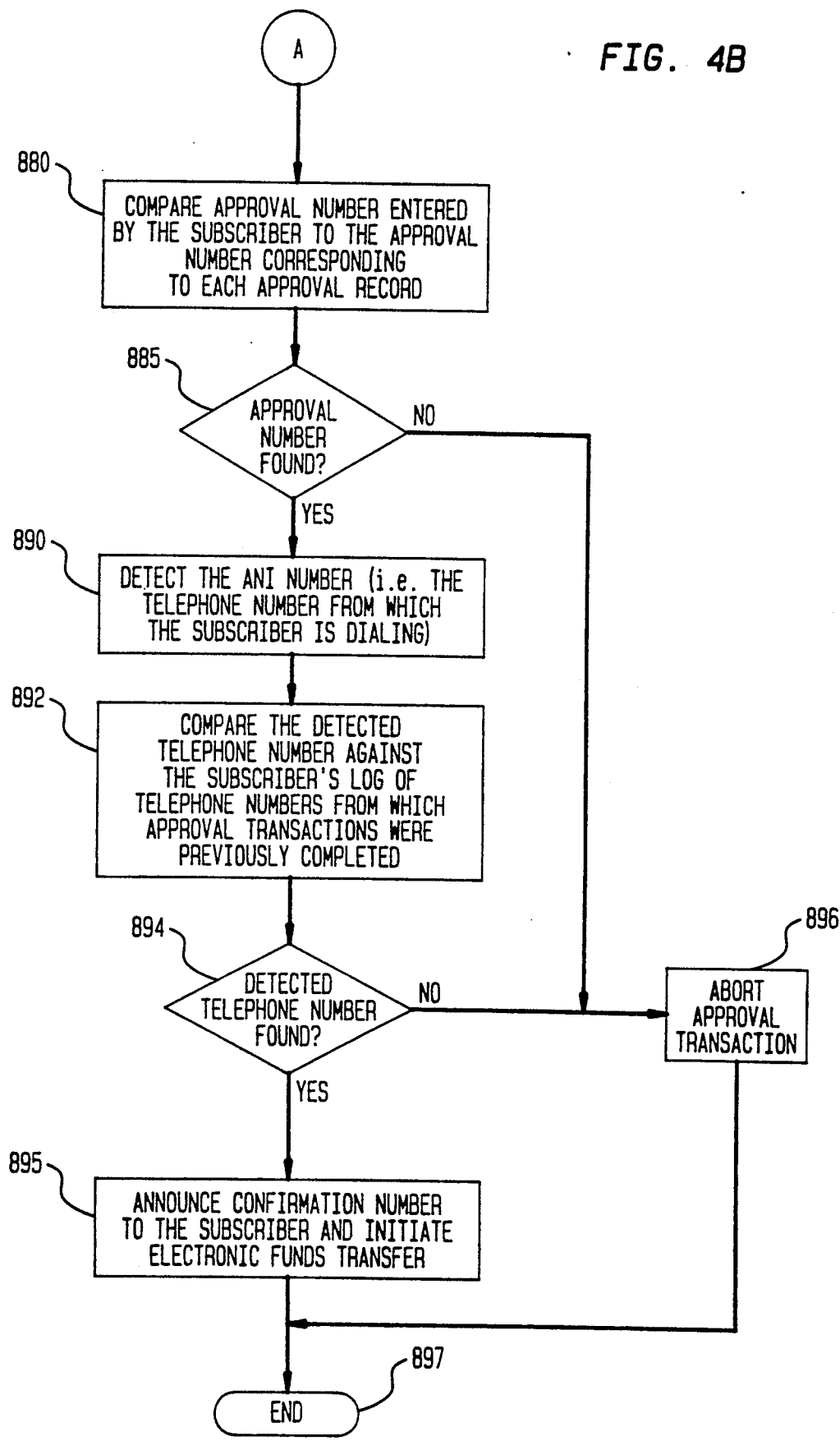

A flow diagram of my inventive method for paying telephone bills electronically is depicted in FIGS. 4A and 4B. As shown in FIG. 4A, the telephone company billing equipment 200 notifies subscribers of billing charges (step 800) usually by sending, via regular mail, a billing statement itemizing service and usage charges, taxes, etc., for the billing period. Alternatively, it is conceivable that subscribers could be notified of current charges in a manner other than a written billing statement through the mail. For example, technological advancements in the communications industry could permit an itemized list of current charges to be electronically accessed by subscribers via computer or by dialing up, via the public switched telephony network, an interactive data base maintaining billing information.

For subscribers who have not pre-authorized electronic funds transfer for payment of their telephone bill, their billing statement may include a pre-printed pre-authorization form such as that shown in FIG. 5 (steps 810 and 820 of FIG. 4A). As shown in FIG. 5, this form requests the name and address of the subscriber's banking institution, the account number to be debited, and the subscriber's signature. In addition, the subscriber may select payment options such as approving electronic payment only from a particular telephone number or specifying a date, other than the date of approval, on which payment is to be debited from the subscriber's account. The subscriber may be requested to provide a voided blank check for the account to be debited when submitting the pre-authorization form. The pre-authorization form and such documentation could be submitted to the telephone company along with payment of the current bill. Until the subscriber is pre-authorized, no bill payment privileges are available (step 830 of FIG. 4A).

Figure 6:
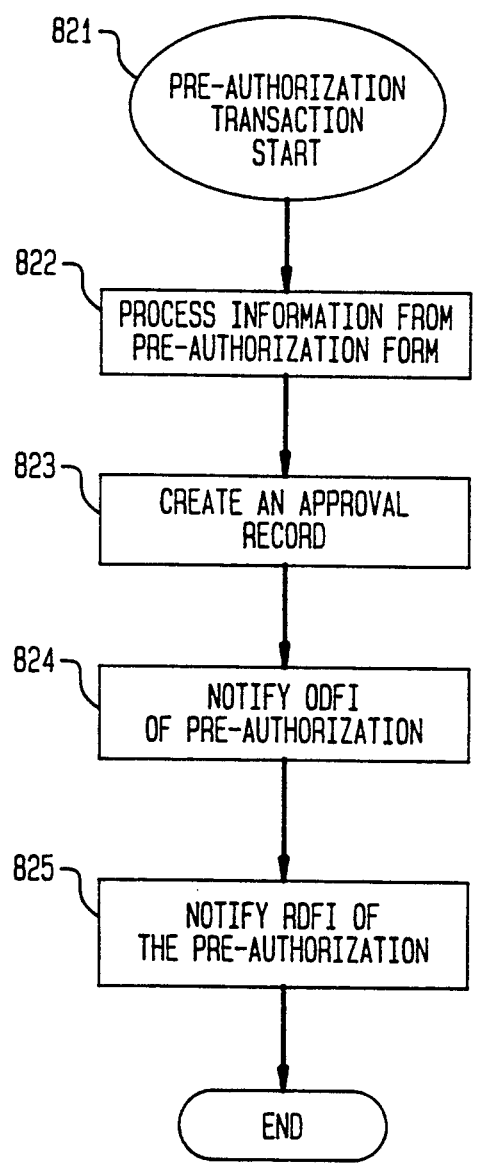
FIG. 6 depicts a flow diagram of a pre-authorization transaction in accordance with an aspect of my invention.

Submission of a pre-authorization form along with other required documentation triggers a pre-authorization transaction. As shown in the flow diagram of FIG. 6, this transaction entails processing the information provided in the form into the billing equipment which may entail scanning the voided blank check and pre-authorization form as permanent reference information (step 822). As a result of the transaction, an approval record is created for the subscriber, which identifies the subscriber as having electronic bill payment privileges (step 823). Notification of the pre-authorization is sent to the ODFI. The ODFI sends notification via an automated clearing house to the RDFI (step 825). The RDFI may follow with notification to the subscriber of the pre-authorization transaction.

During preparation of the monthly billing statements, the billing equipment generates a unique approval number for each pre-authorized subscriber to be included in the subscriber's billing statement along with instructions for approving electronic payment (step 840 of FIG. 4A). An example of how the approval number and approval instructions could be presented in the subscriber's billing statement is shown in FIG. 7. As shown in FIG. 7, the current billing amount, the name and address of the subscriber's banking institution, the telephone number for approving electronic payment, the deadline for electronic payment, and the approval number are presented collectively to assist the subscriber in readily making an informed decision whether to approve electronic payment.

Once the subscriber has reviewed the billing statement of charges and is satisfied that the charges are correct (step 845 of FIG. 4A), then the subscriber can effect payment simply by following the dialing instructions included in the billing statement (step 865). Upon dialing into the network, the subscriber is connected to the payment approval apparatus 300 (FIGS. 1 and 3), which prompts the subscriber to enter the payment approval number pre-printed on the current billing statement. If the approval number is not specially coded for error detection (step 870), then the approval number data base is searched to identify the subscriber approving payment. If the approval number is specially coded to allow for error detection (step 870), a checksum is computed to detect single digit errors and single transpositions and the approval number is decoded to verify its validity (step 875). Upon verifying that the approval number is valid, the approval apparatus then proceeds with a search of the approval record data base (step 880 of FIG. 4B). If the approval number entered by the subscriber is found in the approval record data base (step 885), then further security checks may be conducted. But, if the approval number is not found, then the approval transaction could be aborted (step 896).

As an additional security measure, the payment approval apparatus could also collect, using Automatic Number Identification (ANI), the telephone number from which the subscriber is dialing (step 890). The ANI number is compared with a call history log of telephone numbers from which the subscriber has previously dialed to approve electronic payment (step 892). If the ANI number does not match any number in the subscriber's call history log or the subscriber's home telephone number, then the subscriber's approval transaction could be aborted (steps 894 and 896), or the subscriber could be prompted by the approval apparatus for additional identification information (not shown). For example, the subscriber could be prompted for the last four digits of his or her bank account number, or a telephone number (other than the billed telephone number) from which the subscriber has previously approved payment. Prompting the subscriber for additional information is a security measure to deter system abuses and fraudulent transaction attempts. Upon successful completion of the approval transaction and all checks being cleared, a confirmation number is announced to the subscriber as verification of bill payment approval (step 895).

Approval Number

In order to approve electronic payment of his or her telephone bill, in most cases a pre-authorized subscriber need only enter the approval number, which is unique to his or her assigned bill. Since the unique approval number and approval instruction are pre-printed on each subscriber's billing statement, there are no personal identification numbers (PINs) or special access codes to be remembered or entered by the subscriber. Furthermore, there are no lengthy or complicated menus to move through and no sensitive information (such as bank account numbers) to be inputted during the approval transaction.

Although the use of the approval number makes my bill payment system and method simple, it is also inherently secure. Entry of the approval number during the approval transaction triggers only full payment of the bill from the subscriber's bank account to the telephone service provider as prearranged during the pre-authorization transaction. Therefore, there is little or nothing to be gained by opportunists seeking to directly profit by randomly entering an approval number. However, there is legitimate concern regarding accidental or malicious entry of approval numbers which might trigger payment of another subscriber's telephone bill.

To guard against accidental or malicious entry of approval numbers, the approval number generator (230 of FIG. 2) of my invention generates approval numbers such that single substitutions and single transpositions are detectable. As an additional security measure, the approval number generator employs an invertible hash function operating on the subscriber's account number, such that the approval number can be computed independently by the payment approval apparatus (300 of FIG. 1) without having to transfer assigned approval numbers from the billing equipment 200 to the payment approval apparatus 300.

Figure 8:
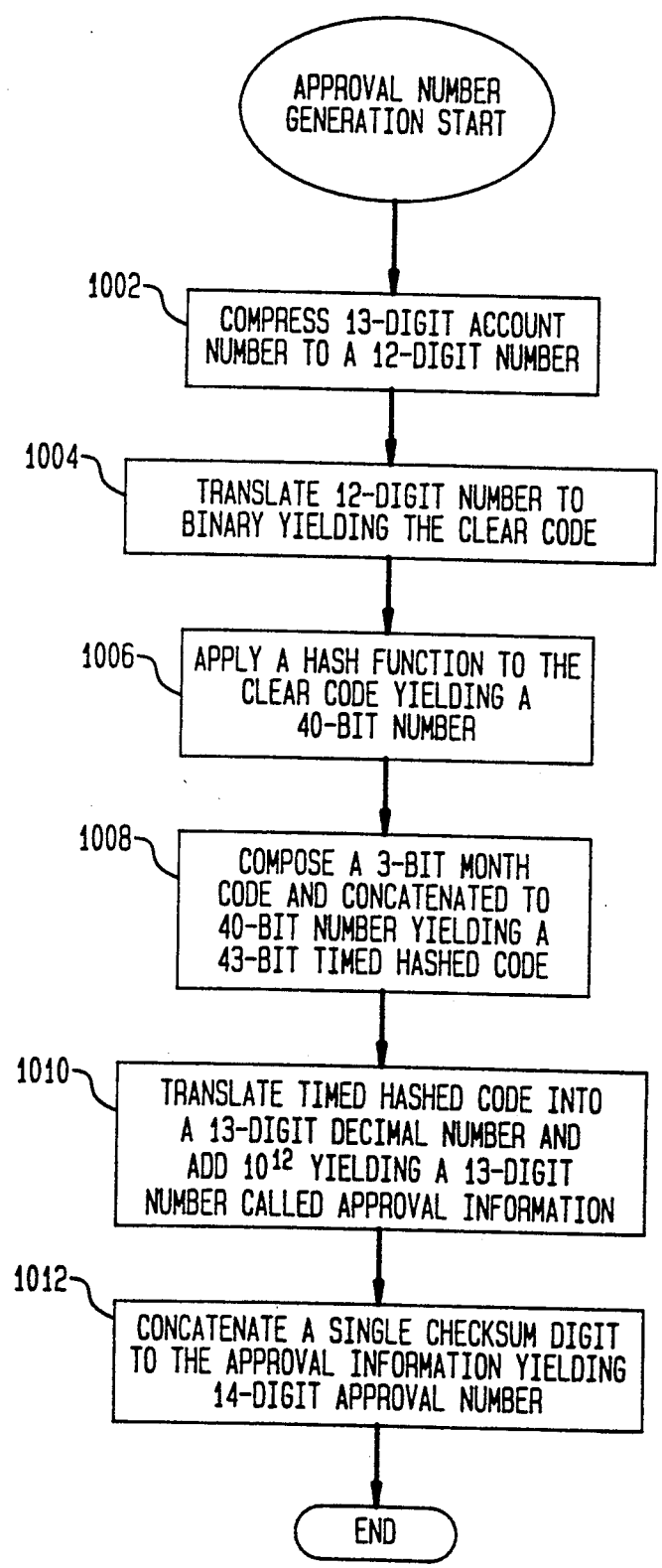
FIG. 8 depicts a flow diagram of a method for generating approval numbers based upon a subscriber's account number in accordance with an aspect of my invention.

Assuming illustratively that each subscriber's account is assigned a number consisting of thirteen digits (possibly, the subscriber's telephone number (10 digits) and a subscriber code (3 digits)), the approval number is generated as shown in the flow diagram of FIG. 8 and described below. Generation of the approval number begins with the compression of the 13-digit account number to a 12-digit number (step 1002). Compression can be accomplished by encoding the area codes served by a single bill payment system as two digits only using a small look-up table. The 12-digit compressed number is then translated to binary resulting in a 40-bit number, which is referred to as the clear code (step 1004). A hash function, which uses a secret key specific to the billing month, is applied to the clear code (step 1006).

Application of the hash function achieves pseudo randomness which is an important element of security. Descriptions of various hash functions are described in *Data Encryption Standard*, The National Bureau of Standards, January 1977, U.S. Department of Commerce FIPS pub. 46, and *How to Construct Pseudo Random Permutations from Pseudo Random Functions*, M. Luby and C. Rackoff, SIAM J. Comput., 17(2), 373-386, 1988.

Next, a 3-bit month code is composed which is concentrated to the 40-bit hashed code and positioned as the most significant bits of the resulting 43-bit number. The resulting 43-bit number is called the timed hashed code (step 1008). One possible way to generate the month code, mc, for some month, m, in some odd or even year, y, is as follows:

$$mc = m - 1 (\text{mod } 8) \text{ for even y}$$

$$mc = m + 3 (\text{mod } 8) \text{ for odd y}.$$

For example, January 1994 (m=1, y=even) is encoded by "0" (since 1−1=0 mod 8), and October 1993 (m=10, y=odd) is encoded by 5(since 10+3=5 mod 8).

The timed hashed code is then translated into a 13-digit decimal number and $10^{12}$ is added to the result, which yields a 13-digit number called approval information (step 1010). Under this scheme, the approval information still has 13 digits and does not have a leading zero. A single checksum digit is concatenated to the approval information as the least significant digit resulting in the approval number (step 1012). This step allows detection of two frequent errors made by subscriber during dial tone multi-frequency (DTMF) number entry which include any substitution of a single digit by another or any transposition of two adjacent digits. A method of generating a checksum digit as described above is discussed in *A New Class of Check-Digit Methods for Arbitrary Number Systems*, IEEE Trans. on Information Theory, IT-31:1-2-105, January 1985.

Figure 9A:
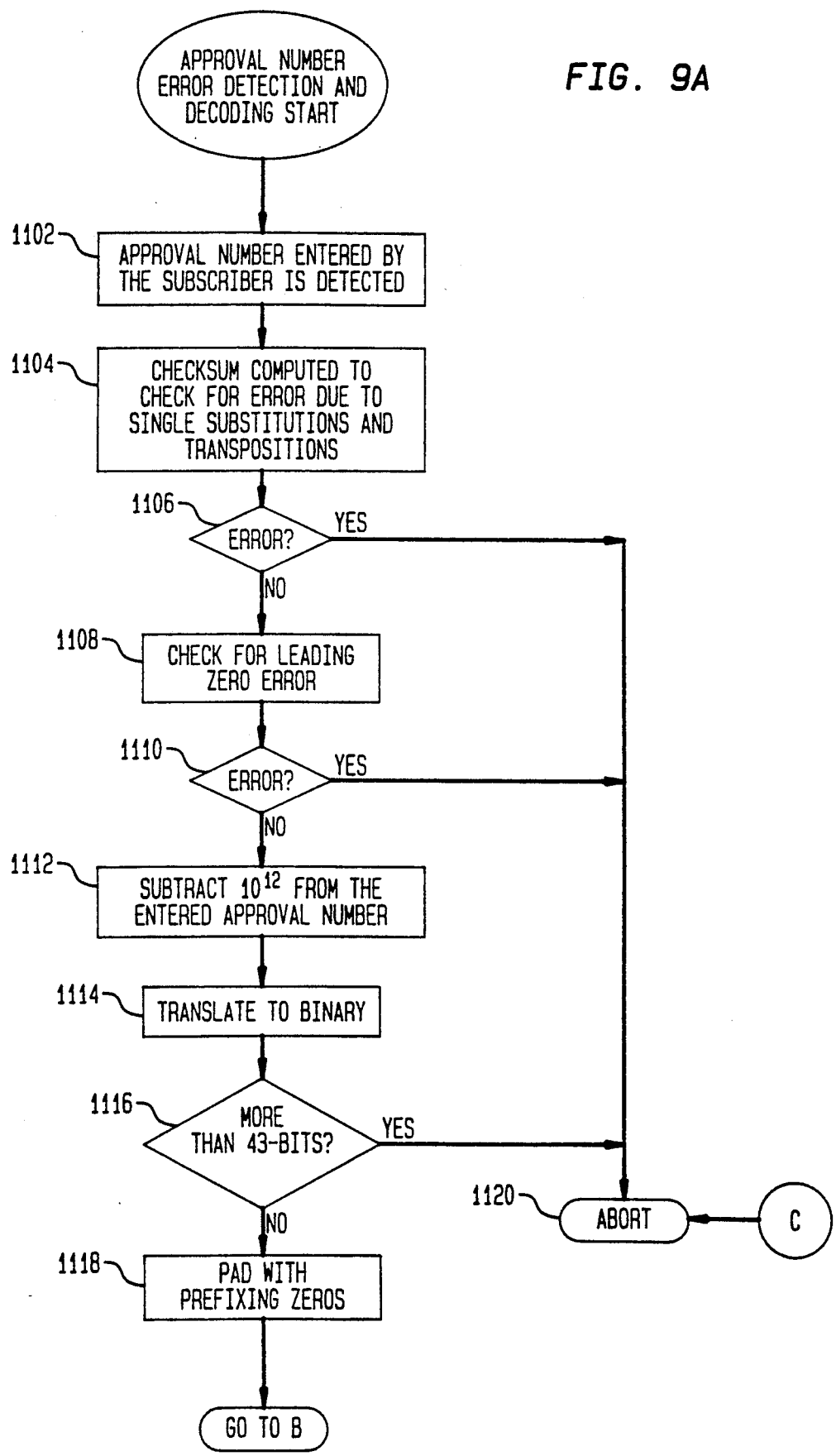
FIGS. 9A and 9B depict a flow diagram of a method for detecting errors and decoding an approval number in accordance with an embodiment of my invention.
Figure 9B:
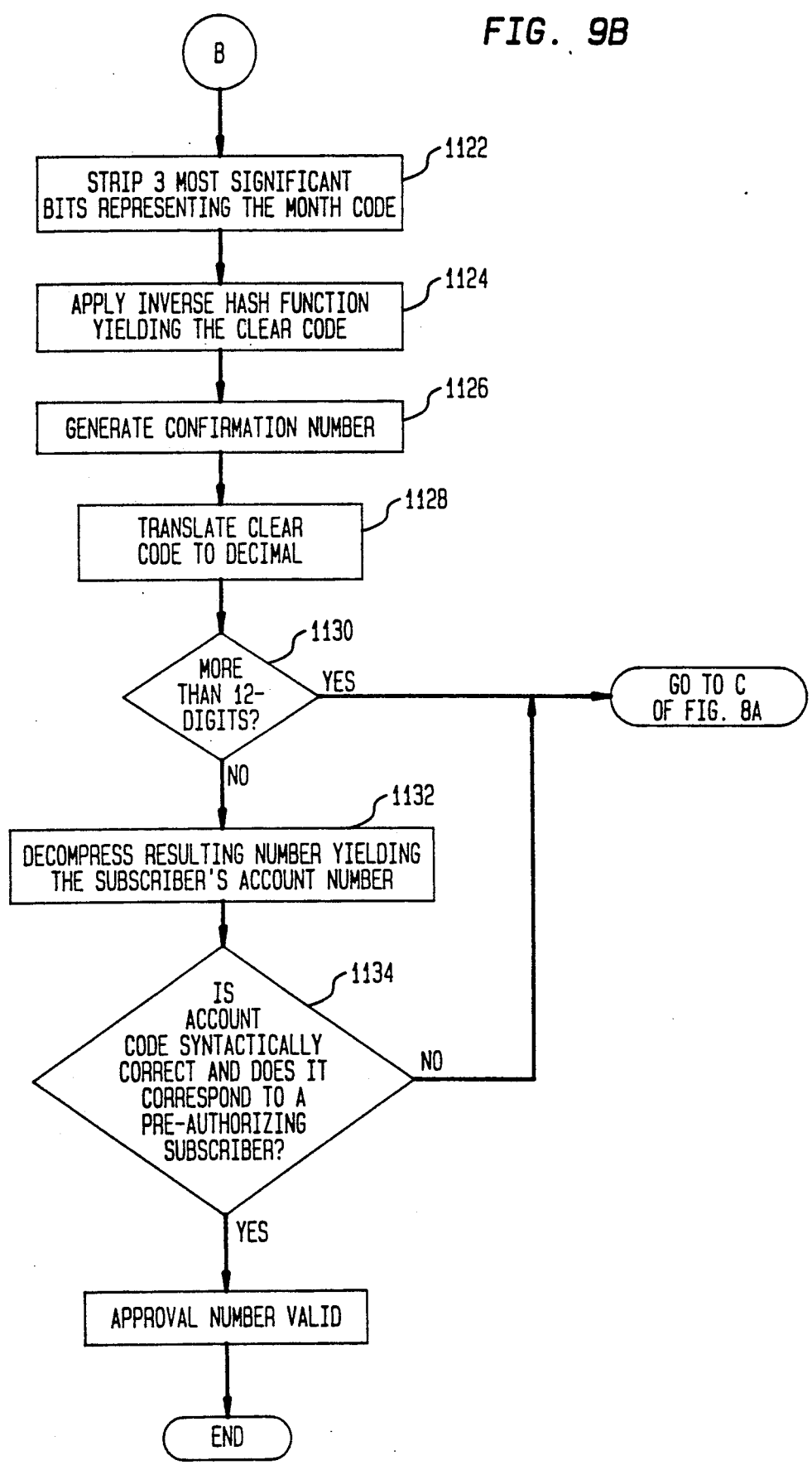

During an approval transaction, error detection and decoding of the approval number can be performed as shown in the flow diagrams of FIGS. 9A and 9B described below. Initially, the payment approval apparatus detects the 14-digit approval number entered by the subscriber (step 1102). Initially, detection for substitution and transposition error is performed by computing the checksum (step 1104). Also, detection for a leading zero error is performed (step 1108). If an error is detected in either step 1106 or 1110, the transaction could be automatically aborted (step 1120 as shown in FIG. 9A) or the subscriber could be prompted to re-enter the 14-digit approval number. Otherwise, the approval number generation process is essentially reversed to produce the subscriber's account number.

Specifically, $10^{12}$ is subtracted from the approval information (step 1112), and the resulting number is translated into binary (step 1114). If the resulting number is more than 43-bits (step 1116) then an invalid approval number has been entered and the transaction may be aborted (step 1120). Otherwise, the resulting number is padded with prefixing zeros to yield the 43-bit timed hashed code (step 1118). The three most significant bits representing the month code are stripped leaving the hashed code (step 1122 of FIG. 9B). Applying the inverse hashed function to the hashed code (step 1124) yields the clear code. At this point, the confirmation number, discussed below, can be generated (step 1126), but only to be announced after all checks have been successfully completed.

The clear code is then translated to decimal producing the compressed account number (step 1128). If the resulting number has more than 12 digits, then an error exists and the transaction may be aborted (step 1130). Otherwise, the compressed account number is decompressed yielding the subscriber's account number (step 1132). The account number is then checked to verify that it is syntactically correct and compared against approval records in the approval record data base to verify that the subscriber has pre-authorized electronic bill payment. If the account number belongs to a pre-authorized subscriber, and all other security checks are passed, then the confirmation number is announced to the subscriber, and an EFT transaction is initiated.

To illustrate the security offered by approval numbers generated in this fashion, consider a large billing operation which issues 10,000,000 billing statements per month. Since the 10,000,000 approval numbers are a sparse, pseudo-random subset of the more than 1,000,000,000,000 possible 40-bit hash codes, the chances that a random keying by a malicious person would result in a legitimate approval number are less than one in 100,000. The same degree of protection is offered against the possibility that the user makes two or more keying errors.

Upon successfully completing an approval transaction, the subscriber is given a confirmation number as verification of bill payment. The confirmation number could be generated based upon the account number in a manner similar to the approval number to ensure that the pseudo randomness, thus, security of the confirmation number is preserved (step 1126 of FIG. 9B). It is important that the confirmation number not be guessable by the subscriber; otherwise, the subscriber could claim to have approved timely payment when they had not done so.

CONCLUSION

Thus, an electronic bill payment system and method have been described. The bill payment system includes billing equipment which generates billing statements, assigns a unique approval numbers for the bill of each pre-authorized subscriber, and creates an approval record for each pre-authorized subscriber. Approval numbers can be generated such that single transpositions and single substitutions are detectable. As an additional security measure, approval numbers are generated using an invertible hash function such that approval numbers can be computed independently by the billing equipment and the payment approval apparatus. The electronic bill payment system also includes a payment approval apparatus into which the subscriber dials to approve payment by entering the approval number, and if necessary, other information for security purposes. The electronic bill payment system also includes databases: an approval record data base for storing approval records created at the billing equipment and accessed by the payment approval system; and a call history log which stores, for each subscriber, a log of telephone numbers from which the subscriber previously approved electronic payment of his or her telephone bill.

When the subscriber dials into the network to approve electronic payment and enters the assigned approval number, a checksum is computed to detect single transpositions and substitutions resulting from accidental or malicious entry of incorrect approval numbers and the approval number is decoded. The validity of the approval number is further verified by searching the approval record data base for a corresponding approval record indicating electronic bill payment privileges. The telephone number from which the subscriber is dialing is also detected and compared against the subscriber's log in the call history log data base. If all checks are cleared, a confirmation number is announced to the subscriber and an electronic funds transfer is initiated. Numerous alternative embodiments of the present invention may be devised without departure from the spirit and scope of the following claims.

What is claimed is:

1. A bill payment system for allowing subscribers to pay their bills via electronic funds transfer, comprising:
   billing equipment including
      means for preparing a billing statement of each of the subscribers' current charges, at least a first of said billing statements including a pre-authorization form to be completed by subscribers to pre-authorize payment of future bills via electronic transfer,
      means for creating an approval record for each of the subscribers who pre-authorize electronic bill payment, and
      means for generating a unique approval number for each of the subscribers who have pre-authorized electronic payment and to be used by said pre-authorized subscribers to approve electronic payment of said current bill;
   means common to subscribers for storing approval records of subscribers and
   means for approving electronic payment of the subscribers' current charges in response to signalling from subscribers, said payment approval means including
      means for prompting subscribers for information and detecting subscribers' responses and other information, and
      means for comparing subscribers' responses with information in said means for storing said approval records.

2. The bill payment system of claim 1 further comprising
   means for printing said approval numbers generated at said generating means in said billing statements of said pre-authorizing subscribers.

3. The bill payment system of claim 1 wherein said payment approval means further comprises
   means for controlling prompts to subscribers from said prompting and detecting means and for controlling billing approval instructions to said billing equipment based upon input from said comparing means.

4. The bill payment system of claim 1 further comprising
   means for storing call history logs of telephone numbers from which subscribers have previously approved electronic bill payment.

5. The bill payment system of claim 4 wherein said prompting and detecting means of said payment approval means detects a telephone number from which the subscribers are dialing and wherein said approval means further comprises second comparator means for comparing said detected telephone numbers with said call history log.

6. The bill payment system of claim 5 wherein said payment approval means further comprises means for updating the subscribers' call history log in said call history log storage means with said detected telephone numbers.

7. The bill payment system of claim 1 further comprising means for transmitting from said billing equipment to said payment approval means said approval records, once created, for storage in said approval record storage means and wherein said approval records contain said approval numbers.

8. The bill payment system of claim 3 wherein, said controlling means includes means for transmitting to said billing equipment instructions to effect an electronic funds transfer for said charges denoted on the subscribers' billing statements.

9. The bill payment system of claim 3 wherein said controlling means includes means for effecting electronic funds transfer for the amount denoted on subscribers' billing statements.

10. The bill payment system of claim 1 wherein said payment approval means comprises means for independently generating approval numbers corresponding to said approval records thus precluding the need to transmit approval numbers from said billing equipment to said payment approval means, said independent generating means being distinct from said billing equipment.

11. The bill payment system of claim 1 wherein said generating means generates approval numbers crytographically and employs error detection, such that single substitutions and single transpositions are detectable.

12. The bill payment system of claim 1 wherein said generating means generates approval numbers using an invertible hash function operating on subscribers' account numbers.

13. A method for a subscriber to control a payment approval apparatus to electronically pay a bill via electronic funds transfer, comprising the steps of:

receiving from the subscriber pre-authorization to pay his or her bills via electronic funds transfer subject to their review and approval of a current billing statement;

creating an approval record for the pre-authorized subscriber, said approval record comprising the name and address of the subscriber's banking institution and subscriber's bank account number to be debitted and being stored at storage means, which stores approval records of multiple subscribers;

generating an approval number which uniquely identifies the subscriber's current bill;

providing the subscriber with a billing statement for the current billing period which includes said approval number and dialing instructions for approving electronic payment of the bill;

upon the subscriber dialing into the payment approval apparatus, as instructed, and entering said approval number, comparing said entered approval number with said approval number contained in each of said approval records at said storage means to identify the corresponding approval record; and if a match is found, causing an electronic funds transfer to occur from the subscriber's banking account for the amount indicated in the billing statement.

14. The method of claim 13 for a subscriber to electronically pay a bill via electronic funds transfer further comprising the steps of:

at said payment approval apparatus, collecting a telephone number from which the subscriber is dialing; and comparing said collected telephone number with a call history log of telephone numbers from the subscriber has previously approved electronic payment.

15. The method of claim 14 for a subscriber to electronically pay a bill via electronic funds transfer further comprising the step of:

after the payment approval transaction is complete, updating the subscriber's call history log with said collected telephone number.

16. The method of claim 13 for a subscriber to electronically pay a bill via electronic funds transfer further comprising the step of:

marking the subscriber's approval record to indicate that the bill has been paid.

17. The method of claim 13 for a subscriber to electronically pay a bill via electronic funds transfer wherein said approval number generating step for generating said approval number includes the steps of selecting from a pseudo-randomly chosen subset of the possible approval numbers using a hash function.

18. The method of claim 13 for a subscriber to electronically pay a bill via electronic funds transfer wherein said approval number generating step for generating said approval number includes encoding said approval number to facilitate error detection of errors occurring during entry of said approval number into said payment approval means.

19. The method of claim 13 for a subscriber to electronically pay a bill via electronic funds transfer, further comprising the steps of generating and sending to the subscriber a confirmation number to confirm the subscriber's approval of electronic bill payment wherein said confirmation number is selected pseudo-randomly from the set of possible confirmation numbers.

* * * * *